(12) United States Patent
Ono et al.

(10) Patent No.: US 9,219,282 B2
(45) Date of Patent: Dec. 22, 2015

(54) MEMBRANE ELECTRODE ASSEMBLY

(71) Applicant: NISSAN MOTOR CO., LTD., Yokohama-shi, Kanagawa (JP)

(72) Inventors: Kei Ono, Yokohama (JP); Takayuki Terasaki, Yokohama (JP); Masaya Yamamoto, Yokosuka (JP); Kenichi Toyoshima, Yokohama (JP); Norifumi Horibe, Fujisawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/413,511

(22) PCT Filed: Jun. 24, 2013

(86) PCT No.: PCT/JP2013/067276
§ 371 (c)(1),
(2) Date: Jan. 8, 2015

(87) PCT Pub. No.: WO2014/010399
PCT Pub. Date: Jan. 16, 2014

(65) Prior Publication Data
US 2015/0188151 A1 Jul. 2, 2015

(30) Foreign Application Priority Data
Jul. 10, 2012 (JP) .................. 2012-154961

(51) Int. Cl.
*H01M 8/02* (2006.01)
*H01M 8/10* (2006.01)
*H01M 8/24* (2006.01)

(52) U.S. Cl.
CPC .......... *H01M 8/0273* (2013.01); *H01M 8/1004* (2013.01); *H01M 8/1018* (2013.01); *H01M 8/0284* (2013.01); *H01M 8/246* (2013.01); *H01M 8/2465* (2013.01); *H01M 8/2485* (2013.01);
(Continued)

(58) Field of Classification Search
CPC ........... H01M 8/0273; H01M 8/1004; H01M 8/1018; H01M 8/0284; H01M 8/2485; H01M 8/2465; H01M 8/246
See application file for complete search history.

(56) References Cited

U.S. PATENT DOCUMENTS

| 5,464,700 A | 11/1995 | Steck et al. |
| 2005/0095490 A1* | 5/2005 | Mittelstadt et al. ............. 429/35 |

(Continued)

FOREIGN PATENT DOCUMENTS

| JP | 7501417 A | 2/1995 |
| JP | 2005302526 A | 10/2005 |

(Continued)

*Primary Examiner* — Milton I Cano
*Assistant Examiner* — Stephen Yanchuk
(74) *Attorney, Agent, or Firm* — Young Basile

(57) ABSTRACT

A membrane electrode assembly includes an electrolyte membran and frame-shaped first and second gaskets disposed on both surfaces of the electrolyte membrane. The first and second gaskets have overlapping portions which are positioned at a peripheral edge of the electrolyte membrane and face to the electrolyte membrane, and bonding portions which are positioned outside of the peripheral edge and bonded to each other. The overlapping portions and the bonding portions have through holes which extend in a thickness direction of the electrolyte membrane. An aperture ratio of the through holes of the overlapping portions is greater than an aperture ratio of the through holes of the bonding.

4 Claims, 7 Drawing Sheets

(52) U.S. Cl.
CPC ...... *H01M 2008/1095* (2013.01); *Y02E 60/523* (2013.01)

(56) References Cited

U.S. PATENT DOCUMENTS

| | | |
|---|---|---|
| 2006/0046121 A1 | 3/2006 | Shimohira et al. |
| 2006/0222813 A1 | 10/2006 | Kato et al. |
| 2010/0032088 A1 | 2/2010 | Kato et al. |
| 2011/0177423 A1 | 7/2011 | Nachtmann et al. |

FOREIGN PATENT DOCUMENTS

| | | |
|---|---|---|
| JP | 2006100266 A | 4/2006 |
| JP | 2006331700 A | 12/2006 |
| JP | 2010115663 A | 5/2010 |
| JP | 4898221 B2 | 3/2012 |
| WO | 2011089008 A1 | 7/2011 |

* cited by examiner

COMPARISON EXAMPLE 1

COMPARISON EXAMPLE 2

COMPARISON EXAMPLE 1

COMPARISON EXAMPLE 2

MODIFICATION

MEMBRANE ELECTRODE ASSEMBLY

CROSS REFERENCE TO RELATED APPLICATION

The present application claims priority to Japanese Patent Application No. 2012-154961, filed Jul. 10, 2012, incorporated herein in its entirety.

TECHNICAL FIELD

The present invention relates to a membrane electrode assembly.

BACKGROUND

A membrane electrode assembly (MEA) included in a unit cell of a fuel cell has a polymer electrolyte membrane where a catalyst layer is disposed, and a frame-shaped gasket disposed on both surfaces of the polymer electrolyte membrane. The gaskets are positioned so as to surround the catalyst layer of the polymer electrolyte membrane, and thus functions to prevent a fuel gas and an oxidizer gas supplied to the catalyst layer from leaking externally.

However, when the gaskets are disposed on both surfaces of the polymer electrolyte membrane and are attached thereto, if bubbles remain between the gaskets and between the gasket and the polymer electrolyte membrane, they become a factor causing a gas leak in the manufactured membrane electrode assembly. On the other hand, a resin sheet having a through hole is known (for example, see Japanese Patent No. 4898221).

However, the resin sheet according to Japanese Patent No. 4898221 is not intended to be used for a gasket, and even though it is applied to the gasket of the membrane electrode assembly, it is difficult to suppress the remaining bubbles. Hence, there is a concern that the fuel gas and the oxidant gas supplied to the catalyst layer leak out externally because a region which is surrounded by the gasket is communicated with a region which is positioned outside of a peripheral edge of the gasket via the remaining bubble, or because the remaining bubbles form a raised portion in the gasket, and thus, the adhesion properties of the gasket and a separator are reduced.

SUMMARY

The present invention has been made to solve the aforementioned problem in the prior art, and aims to provide a membrane electrode assembly where an external leak of a fuel gas and an oxidant gas supplied to a catalyst layer, is suppressed.

The present invention to achieve the abovementioned object is a membrane electrode assembly including an electrolyte membrane, and frame-shaped first and second gaskets disposed on both surfaces of the electrolyte membrane. The first and second gaskets have overlapping portions which are positioned at a peripheral edge of the electrolyte membrane and face the electrolyte membrane, and bonding portions which are positioned outside of the peripheral edge and bonded each other. The overlapping portions and the bonding portions have through holes which extend in a thickness direction of the electrolyte membrane, and an aperture ratio of the through holes of the overlapping portions is greater than an aperture ratio of the through holes of the bonding portions.

According to the present invention, since the overlapping portions and the bonding portions of the first and second gaskets have the through holes which extend in the thickness direction of the electrolyte membrane, after the first and second gaskets are disposed on the electrolyte membrane and are attached thereto, it is possible to remove bubbles remaining in spaces of the bonding portions and the overlapping portions, through the through holes. Moreover, at this time, since the aperture ratio of the through holes of the overlapping portions is greater than the aperture ratio of the through holes of the bonding portions, even when the peripheral edge of the electrolyte membrane is interposed therebetween, the through holes of the overlapping portions exhibits a sufficient bubble removal function. Hereby, in the same manner as the bonding portion of the first gasket and the bonding portion of the second gasket where a polymer electrolyte membrane is not disposed, the overlapping portions and the peripheral edge of the electrolyte membrane are sufficiently bonded, and the remaining of the bubbles is suppressed. Hence, it is possible to provide a membrane electrode assembly where an external leak of a fuel gas and an oxidant gas supplied to a catalyst layer, is suppressed.

The objects, features, and characteristics of this invention other than those set forth above will become apparent from the description given herein below with reference to preferred embodiments illustrated in the accompanying drawings.

DETAILED DESCRIPTION OF THE EMBODIMENTS

Hereinafter, embodiments of the present invention will be described with reference to the drawings.

Figure 1:
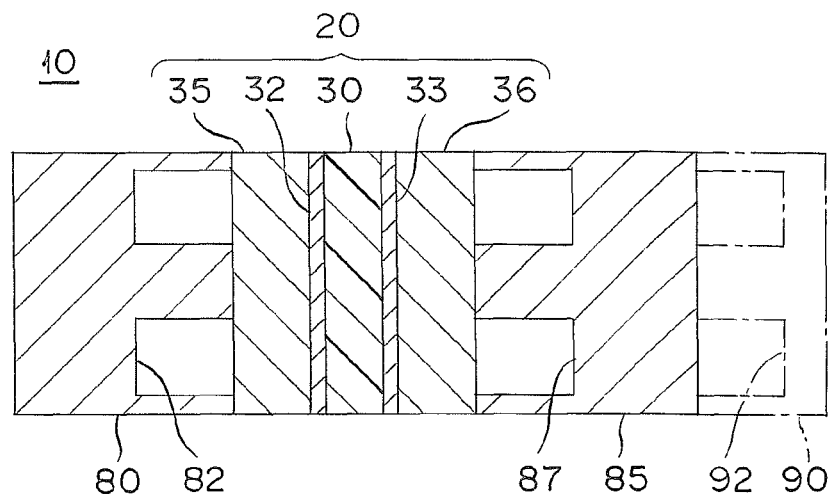
FIG. 1 is a cross-sectional view illustrating a cell structure of a fuel cell according to an embodiment of the present invention.
Figure 2:
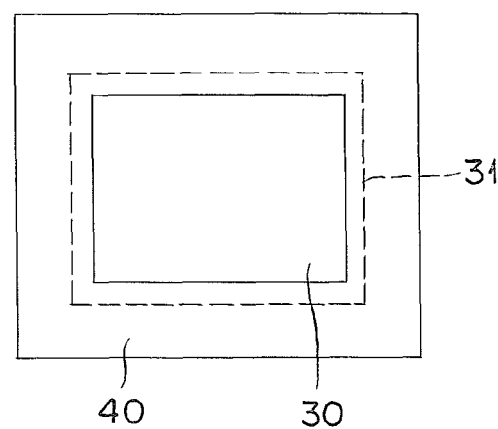
FIG. 2 is a plan view illustrating first and second gaskets that are disposed on both surfaces of a peripheral section of a polymer electrolyte membrane shown in FIG. 1.
Figure 3:
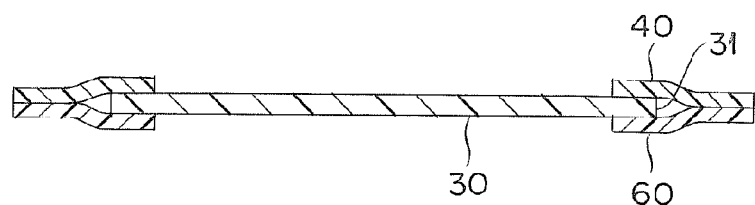
FIG. 3 is a cross-sectional view illustrating the first and second gaskets that are disposed on both surfaces of the peripheral section of the polymer electrolyte membrane shown in FIG. 1.

FIG. 1 is a cross-sectional view illustrating a cell structure of a fuel cell according to an embodiment of the present invention, and FIG. 2 and FIG. 3 are a plan view and a cross-sectional view illustrating first and second gaskets that are disposed on both surfaces of a peripheral section of a polymer electrolyte membrane shown in FIG. 1.

A unit cell 10 shown in FIG. 1 is applied to a polymer electrolyte fuel cell (PEFC) which uses hydrogen as a fuel, or the like, and includes a membrane electrode assembly 20 and separators 80, 85. Furthermore, when the unit cells 10 are stacked to be used, for example, the unit cell 10 further has a cooling plate 90, and a recess 92 provided in the cooling panel 90 constitutes a coolant passage through which the coolant flows to cool the unit cell 10.

The membrane electrode assembly 20 has a polymer electrolyte membrane 30, catalyst layers 32 and 33, gas diffusion layers (GDL) 35 and 36, a first gasket 40, and a second gasket 60.

The catalyst layer 32 includes a catalyst component, electrically conductive catalyst carriers which carry the catalyst component, and a polymer electrolyte, and is an anode catalyst layer in which oxidation of hydrogen progresses, and is disposed on one side of the polymer electrolyte membrane 30. The catalyst layer 33 includes a catalyst component, electrically conductive catalyst carriers which carry the catalyst component, and a polymer electrolyte, is a cathode catalyst layer in which reduction of oxygen progresses, and is disposed on the other side of the polymer electrolyte membrane 30.

The polymer electrolyte membrane 30 functions to cause protons generated in the catalyst layer 32 to be selectively transmitted to the catalyst layer 33, and functions as a barrier wall to separate a fuel gas supplied to an anode side thereof and an oxidizer gas supplied to a cathode side thereof.

The gas diffusion layer 35 is an anode gas diffusion layer serving to diffuse the fuel gas supplied to the anode side and is positioned between the separator 80 and the catalyst layer 32. The gas diffusion layer 36 is a cathode gas diffusion layer serving to diffuse the oxidizer gas supplied to the cathode side and is positioned between the separator 85 and the catalyst layer 33.

The first and second gaskets 40, 60 are frame-shaped and disposed respectively on both surfaces of an outer circumference portion of the polymer electrolyte membrane 30, as shown in FIG. 2 and FIG. 3. The gasket 40 is positioned to surround the catalyst layer 32 and the gas diffusion layer 35, and functions to prevent the fuel gas supplied to the catalyst layer 32 from leaking externally. The gasket 60 is positioned to surround the catalyst layer 33 and the gas diffusion layer 36, and functions to prevent the oxidizer gas supplied to the catalyst layer 33 from leaking externally.

The separators 80, 85 function to electrically connect the unit cells 10 to each other in series and function as a barrier wall to separate the fuel gas, the oxidizer gas, and the coolant from each other, and they have substantially the same shape as the membrane electrode assembly 20, and for example, are formed by press working a stainless steel sheet. The stainless steel sheet is preferable in that a complicated machine work is easily performed and electrical conductivity is high, and a coating for corrosion resistance may be applied to it, as necessary.

The separator 80 is an anode separator disposed on the anode side of the membrane electrode assembly 20, faces the catalyst layer 32, and has a recess 82 constituting a gas passage which is positioned between the membrane electrode assembly 20 and the separator 80. The recess (gas passage) 82 is used for supplying the fuel gas to the catalyst layer 32.

The separator 85 is a cathode separator disposed on the cathode side of the membrane electrode assembly 20, faces the catalyst layer 33, and has a recess 87 constituting a gas passage which is positioned between the membrane electrode assembly 20 and the separator 85. The recess (gas passage) 87 is used for supplying the oxidizer gas to the catalyst layer 33.

Next, the material, the size, and the like of each constituent member will be described in detail.

As the polymer electrolyte membrane 30, a fluorine system polymer electrolyte membrane constituted by a perfluoro carbon sulfonic acid-based polymer, a hydrocarbon-based resin film having a sulfonic acid group, and a porous film which is impregnated with an electrolyte component such as phosphoric acid or ionic liquid may be applied. The perfluoro carbon sulfonic acid-based polymer may be NAFION (trademark, product made by Dupont Co., Ltd.), ACIPLEX (trademark, product made by Asahi Kasei Co., Ltd.), or FLEMION (trademark, product made by Asahi Glass Co., Ltd.). The porous film is formed from polytetrafluoroethylene (PTFE) or polyvinylidene fluoride (PVDF), for example.

The thickness of the polymer electrolyte membrane 30 is not particularly limited, but preferably in a range of 5 μm to 300 and more preferably in a range of 10 μm to 200 μm in view of strength, durability, and output characteristics.

The catalyst component used in the catalyst layer (cathode catalyst layer) 35 is not particularly limited as long as the catalyst component performs catalytic action in the reduction of oxygen. The catalyst component used in the catalyst layer (anode catalyst layer) 34 is not particularly limited as long as the catalyst component has catalytic action in the oxidation of hydrogen.

The specific catalyst component is selected from metals such as platinum, ruthenium, iridium, rhodium, palladium, osmium, tungsten, lead, iron, chrome, cobalt, nickel, manganese, vanadium, molybdenum, gallium, and aluminum, or alloys thereof, for example. The catalyst component preferably includes at least platinum in order to improve catalytic activity, poisoning resistance to carbon monoxide and the like, thermal resistance, and the like. It is not necessary that the catalyst components applied in the cathode catalyst layer and the anode catalyst layer be the same, and the catalyst components may be appropriately differentiated.

The electrically conductive catalyst carrier used in the catalyst layers 32, 33 is not particularly limited as long as the electrically conductive catalyst carrier has a specific surface area for carrying the catalyst component in a desired diffusion state, and sufficient electron conductivity as a current collector, but the main component is preferably carbon particles. The carbon particles are formed from carbon black, activated carbon, coke, natural graphite, or artificial graphite, for example.

The polymer electrolyte used in the catalyst layers 32, 33 is not particularly limited as long as the polymer electrolyte is a material which has at least high proton conductivity, and for example, a fluorine-based electrolyte including fluorine atoms in the entirety or a part of a polymer skeleton, or a hydrocarbon-based electrolyte not including fluorine atoms in a polymer skeleton may be applied. The polymer electrolyte used in the catalyst layers 32, 33 may be the same as or different from a polymer electrolyte used in the polymer electrolyte membrane 30, but preferably the same in view of improving adhesion of the catalyst layers 32, 33 to the polymer electrolyte membrane 30.

The gas diffusion layers 35, 36 are formed by using as a base a sheet-shaped material which has electrical conductivity and a porous property such as a carbon-made textile such as a glassy carbon, a sheet-like paper body, felt, or non-woven fabric. The thickness of the base is not particularly limited, but preferably in a range of 30 μm to 500 μm in view of mechanical strength and permeability to gas, water, or the like. In the gas diffusion layers 35, 36, the base preferably includes a water repellent in view of water repellency and suppression of the flooding phenomenon. The water repellent may be, for example, a fluorine-based polymer material such as PTFE, PVDF, polyhexafluoropropylene, or tetrafluoroethylene-hexafluoropropylene copolymer (FEP), and polypropylene, polyethylene.

The first and second gaskets 40, 60 are formed from rubber material, a fluorine-based polymer material, or thermoplastic resin, for example. The rubber material may be fluorine rubber, silicon rubber, ethylene propylene rubber (EPDM), polyisobutylene rubber, or the like. The fluorine-based polymer material may be PTFE, PVDF, polyhexafluoropropylene, FEP, or the like. The thermoplastic resin may be polyolefin, polyester, or the like. Polyester may be, for example, polyethylene naphthalate (PEN). The thickness of the first and second gaskets 40, 60 is not particularly limited, but preferably in a range of 50 μm to 2 mm, and more preferably in a range of 100 μm to 1 mm.

The separators 80, 85 are not limited to the embodiment formed from stainless steel sheet, and other metal materials (for example, aluminum sheet or clad material) and carbon such as dense carbon graphite or a carbon board are also applicable. Recesses 82 and 87 may be formed by means of a cutting process or screen printing in a case where carbon is applied.

Next, the first and second gaskets 40, 60 will be described in detail.

Figure 4:
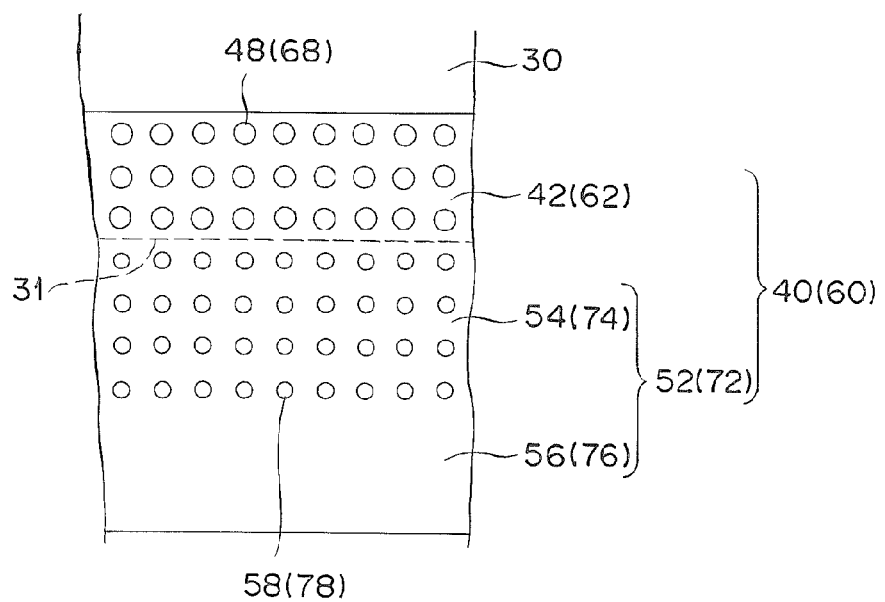
FIG. 4 is a plan view illustrating through holes of the first and second gaskets shown FIG. 2 and FIG. 3.
Figure 5:
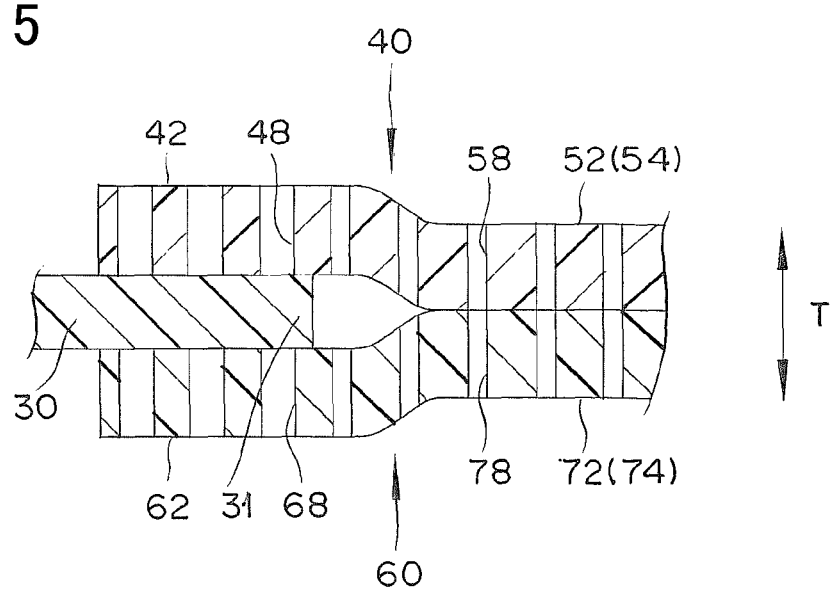
FIG. 5 is a cross-sectional view illustrating the through holes of the first and second gaskets shown FIG. 2 and FIG. 3.
Figure 6:
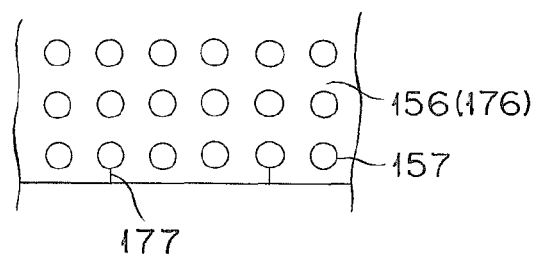
FIG. 6 is a plan view illustrating Comparison Example 1 according to a bonding portion shown in FIG. 4.
Figure 7:
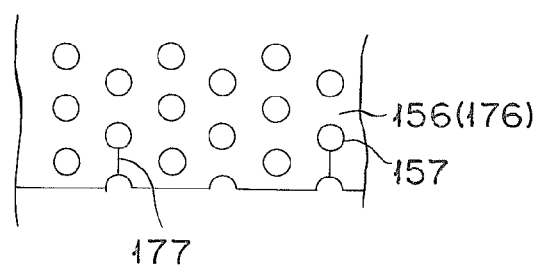
FIG. 7 is a plan view illustrating Comparison Example 2 according to the bonding portion shown in FIG. 4.

FIG. 4 and FIG. 5 are a plan view and a cross-sectional view illustrating through holes of the first and second gaskets shown FIG. 2 and FIG. 3, and FIG. 6 and FIG. 7 are plan views illustrating Comparison Example 1 and Comparison Example 2 according to a bonding portion shown in FIG. 4.

The first and second gaskets 40, 60 have overlapping portions 42, 62 and bonding portions 52, 72.

The overlapping portions 42, 62 are positioned at a peripheral edge 31 of the polymer electrolyte membrane 30 and face the polymer electrolyte membrane 30, and are provided with through holes 48, 68 are provided. The bonding portions 52, 72 are positioned outside of the peripheral edge 31 of the polymer electrolyte membrane 30 and bonded each other, and have inner sections 54, 74 where through holes 58, 78 are disposed, and outer sections 56, 76 which are positioned the outside of the inner sections 54, 74 and where no through hole is disposed. Furthermore, the bonding portions 52, 72 have a function of preventing that the first and second gaskets 40, 60 are detached from the polymer electrolyte membrane 30.

The through holes 48, 68 and the through holes 58, 78 are minute, and extend in a thickness direction T of the polymer electrolyte membrane 30, and thus, influence in a direction perpendicular to the thickness direction T is suppressed. An aperture ratio of the through holes 48, 68 of the overlapping portions 42, 62 is set to be greater than an aperture ratio of the through holes 58, 78 of the bonding portions 52, 72.

In the present embodiment, the aperture ratio of the through holes is adjusted, by changing the diameter (size) of the through holes. That is, the diameter of the through holes 48, 68 of the overlapping portions 42, 62 is greater than the diameter of the through holes 58, 78 of the bonding portions 52, 72, and thereby, it is easy to make the aperture ratio of the through holes 48, 68 of the overlapping portions 42, 62 greater than the aperture ratio of the through holes 58, 78 of the bonding portions 52, 72.

In the outer sections 56, 76 of the bonding portions 52, 72, no through hole is disposed. Hence, it is prevented that cracks 177 are generated and enlarged along through holes 157, or outer sections 156, 176 are split off as shown in Comparison Example 1 of FIG. 6 and Comparison Example 2 of FIG. 7.

The aperture ratio of the through holes is preferably 20% or less from the viewpoint of rigidity, and is preferably 0.2% or more from the viewpoint of the through hole effects. For example, when the through holes are disposed in a rectangular formation, if a pitch interval is set to be two times the diameter of the through holes, the aperture ratio becomes approximately 20%, if the pitch interval is set to be ten times the diameter of the through holes, the aperture ratio becomes approximately 0.1% to 1%, and if the pitch interval is set to be a hundred times the diameter of the through holes, the aperture ratio becomes approximately 0.001% to 0.01%.

When the diameter of the through holes is 0.1μ to 10μ, the pitch interval is preferably two times to a hundred times the diameter, and when the diameter of the through holes is 10μ to 100μ, the pitch interval is preferably two times to ten times the diameter.

A method for forming the through holes is not limited in particular, and it is possible to use a laser, a metal mold, or the like. In the case of the laser, for example, by controlling laser output, spot diameter, scan timing, or the like, the position and the size of the through holes can be adjusted. In the case of the metal mold, for example, it is possible to form melting holes by pressing a cavity face which is configured as a pinholder having minute protrusions, against a gasket raw material and heating it, and the position and the size of the through holes can be adjusted by changing the position and the size of the protrusions.

The catalyst layers 32, 33 may be formed, as necessary, after the first and second gaskets 40, 60 are disposed and attached, or may be formed on the polymer electrolyte membrane 30 in advance. The gas diffusion layers 35, 36 may be disposed after being combined with the catalyst layers 32, 33, or may be separately disposed, for example, at the time of stacking the membrane electrode assembly 20.

Next, actions and effects of the through holes at the time of disposing the first and second gaskets in the membrane electrode assembly will be described.

Figure 10:
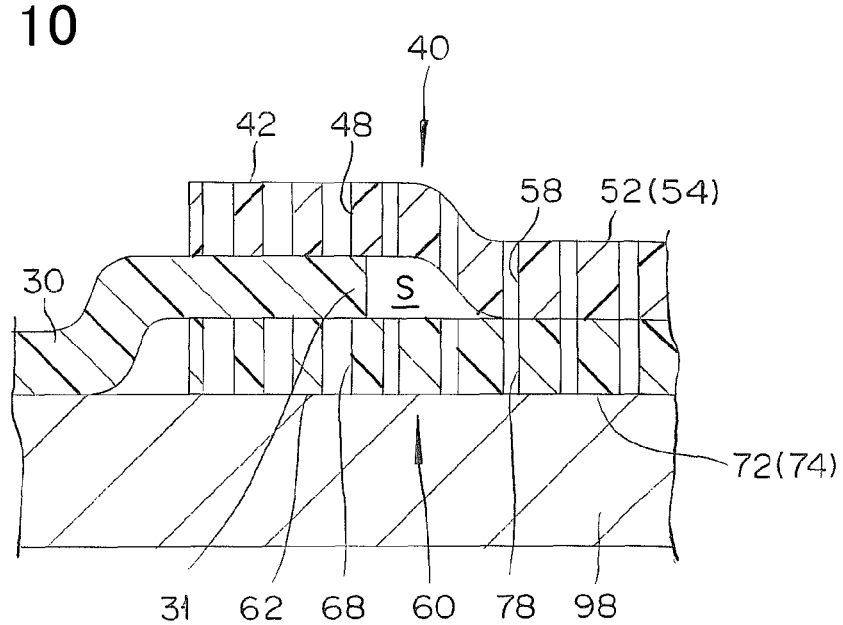
FIG. 10 is a cross-sectional view illustrating the disposition of the first gasket, following the disposition of the polymer electrolyte membrane.
Figure 11:
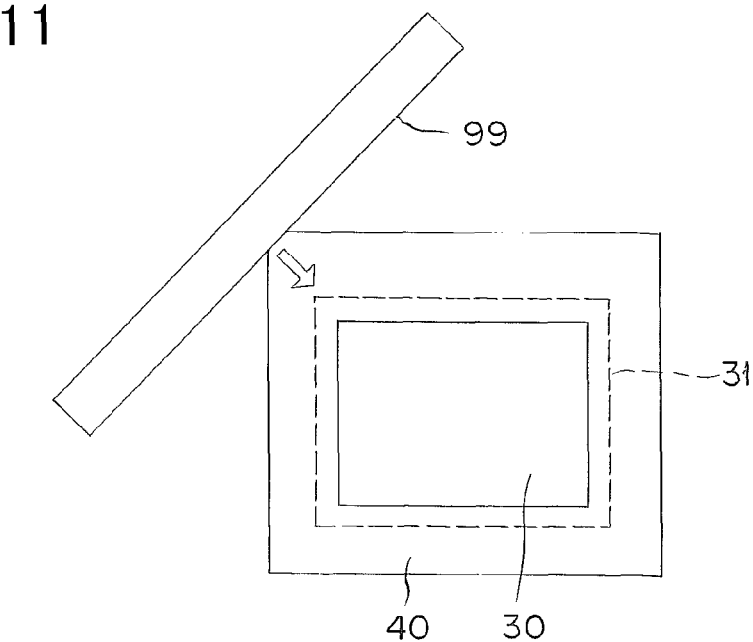
FIG. 11 is a plan view illustrating bubble removal by a squeegee, following the disposition of the first gasket.
Figure 12:
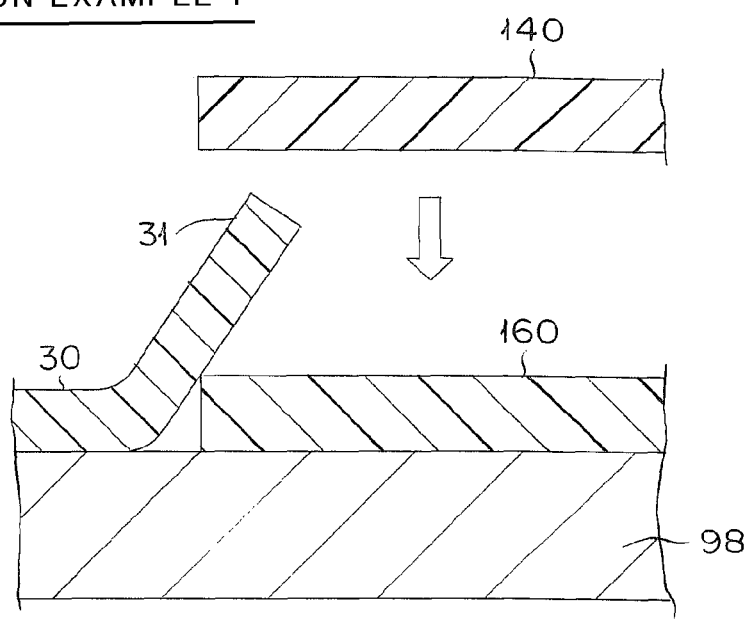
FIG. 12 is a cross-sectional view illustrating Comparison Example 1 according to the disposition of the first gasket.
Figure 13:
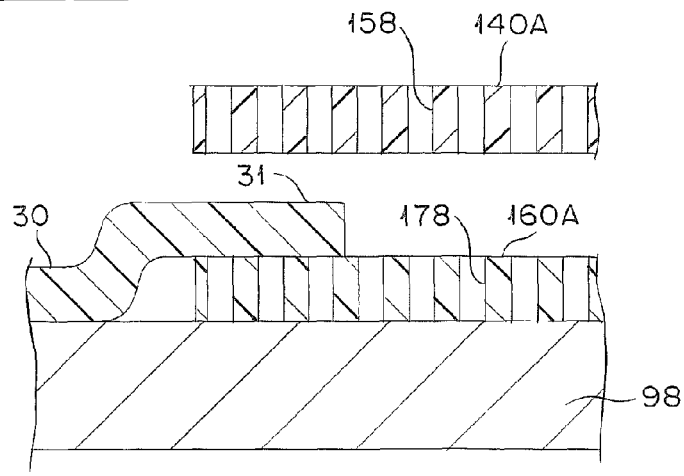
FIG. 13 is a cross-sectional view illustrating Comparison Example 2 according to the disposition of the first gasket.

FIG. 8, FIG. 9, FIG. 10, and FIG. 11 are a cross-sectional view illustrating an disposition of the second gasket, a cross-sectional view illustrating an disposition of the polymer electrolyte membrane, a cross-sectional view illustrating an disposition of the first gasket, and a plan view illustrating bubble removal by a squeegee, and FIG. 12 and FIG. 13 are cross-sectional views illustrating Comparison Example 1 and Comparison Example 2 according to the disposition of the first gasket.

Figure 8:
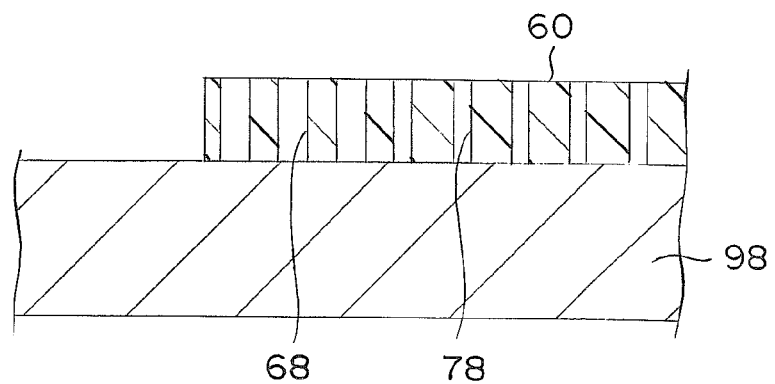
FIG. 8 is a cross-sectional view illustrating dispositions of the first and second gaskets in the polymer electrolyte membrane according to the embodiment of the present invention, and shows the disposition of the second gasket.

When the first and second gaskets 40, 60 are disposed on both surfaces of the peripheral section of the polymer electrolyte membrane 30, firstly, the second gasket 60 is disposed on a mounting table 98 as shown in FIG. 8. The mounting table 98 is composed of a porous member, is connected to an external vacuum source (not shown), and is adapted to be capable of sucking an object disposed thereon.

Figure 9:
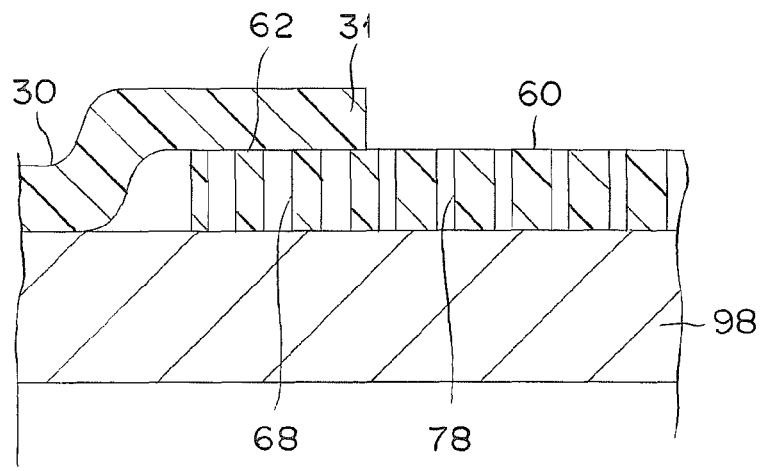
FIG. 9 is a cross-sectional view illustrating the disposition of the polymer electrolyte membrane, following the disposition of the second gasket shown in FIG. 8.

Then, as shown in FIG. 9, the polymer electrolyte membrane 30 is disposed on the mounting table 98 and attached, and the peripheral edge 31 of the polymer electrolyte membrane 30 is positioned so as to overlap the second gasket 60. Hereby, the overlapping portion 62 is formed on the second gasket 60. At this time, since the peripheral edge 31 of the polymer electrolyte membrane 30 is sucked to the mounting table 98 through the through holes 68 formed in the overlapping portion 62 of the second gasket 60, curl-up of the peripheral edge 31 of the polymer electrolyte membrane 30 is suppressed, for example.

Thereafter, as shown in FIG. 10, the first gasket 40 is disposed on the mounting table 98 and is attached, and the first gasket 40 is positioned so as to overlap the peripheral edge 31 of the polymer electrolyte membrane 30. Hereby, the overlapping portion 62 and the bonding portion 52 are formed on the first gasket 40 while the bonding portion 72 is formed on the second gasket 60.

At this time, since the aperture ratio of the through holes 48, 68 of the overlapping portions 42, 62 are set to be greater than the aperture ratio of the through holes 58, 78 of the bonding portions 52, 72, even when the electrolyte membrane 30 is interposed therebetween, the through holes 48, 68 of the overlapping portions 42, 62 exhibit a sufficient bubble removal function. Hereby, in the same manner as the bonding portions 52, 72 where the polymer electrolyte membrane 30 is not disposed, the overlapping portions 42, 62, and the peripheral edge 31 of the polymer electrolyte membrane 30 are sufficiently bonded, and the remaining bubbles are suppressed.

Consequently, since it is avoided that a region surrounded by the first and second gaskets 40, 60 communicates with a region positioned the outside of the peripheral edge of the outer sections 56, 76 of the first and second gaskets 40, 60 through the remaining bubbles (formation of a leakage path of the gas due to the remaining bubbles), and it is prevented that a raised portion generated due to the remaining bubbles forms a space in the bonding portions between the first and second gaskets 40, 60 and the separators 80, 85 and lowers the adhesion properties of the bonding portions, the fuel gas and the oxidant gas which are supplied to the catalyst layers 32, 33 is suppressed from externally leaking. That is, it is possible to provide the membrane electrode assembly 20 where an external leak of the fuel gas and the oxidant gas which are supplied to the catalyst layer is suppressed.

On the other hand, when the through hole is not formed as a first gasket 140 and a second gasket 160 of Comparison Example 1 shown in FIG. 12, the curl-up is generated at the peripheral edge 31 of the polymer electrolyte membrane 30 and, thus, it is difficult to suitably dispose and attach the first gasket 140.

Moreover, when through holes 158 and 178 with large diameters are uniformly formed as a first gasket 140A and a second gasket 160A of Comparison Example 2 shown in FIG. 13, suction (vacuum) has an influence up to the upper surface of the first gasket 140A, and it is difficult to accurately release the first gasket 140A toward the peripheral edge 31 of the polymer electrolyte membrane 30 (second gasket 160A).

As necessary, after the disposition of the first gasket, it is possible to use bubble removal by the squeegee together. In this case, for example, as shown in FIG. 11, by moving a squeegee 99 while sucking by the mounting table 98, the first and second gaskets 40, 60 are pressed. Pressing by the squeegee 99 discharges bubbles (entrained air) remaining in a space S of the bonding portions 52, 72 and the overlapping portions 42, 62 through the through holes 48, 68 of the overlapping portions 42, 62 and the through holes 58, 78 of the bonding portions 52, 72. The squeegee 99 is formed from plastic, metal, or the like.

Furthermore, when the gasket does not have the through holes 48, 58, 68, and 78, it is difficult to remove the bubbles by using the squeegee. For example, even when the squeegee is pressed against the gasket and applies pressure to extrude the bubbles, the bubbles are not removed because the shapes of the bubbles are only lengthened in a lateral direction, and the lengthened bubbles become a factor forming the leakage path of the gas.

Figure 14:
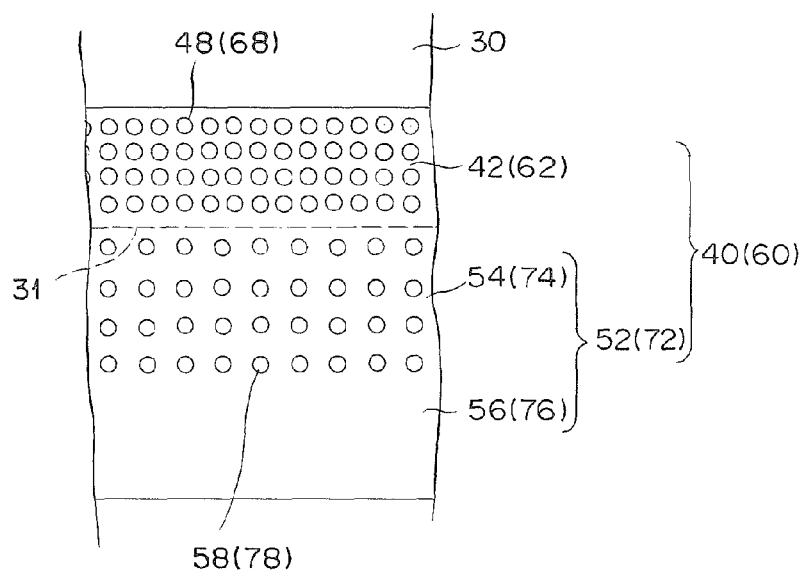
FIG. 14 is a plan view illustrating Modification according to the embodiment of the present invention.

FIG. 14 is a plan view illustrating Modification according to an embodiment of the present invention.

The aperture ratios of the through holes 48, 58, 68, and 78 may be also adjusted by changing density of the through holes 48, 58, 68, and 78. For example, as shown in FIG. 14, the density of the through holes 48, 68 of the overlapping portions 42, 62 is greater than the density of the through holes 58, 78 of the bonding portions 52, 72, and thereby, it is possible to easily adjust the aperture ratio.

As described above, in the embodiments of the present invention, since the overlapping portions and the bonding portions of the first and second gaskets have the through holes which extend in the thickness direction of the electrolyte membrane, after the first and second gaskets are disposed on the electrolyte membrane and are attached thereto, it is possible to remove bubbles remaining in spaces of the bonding portions and the overlapping portions, through the through holes. Moreover, at this time, since the aperture ratio of the through holes of the overlapping portions is greater than the aperture ratio of the through holes of the bonding portions, even when the peripheral edge of the electrolyte membrane is interposed therebetween, the through holes of the overlapping portions exhibits a sufficient bubble removal function. Hereby, in the same manner as the bonding portion of the first gasket and the bonding portion of the second gasket where a polymer electrolyte membrane is not disposed, the overlapping portions and the peripheral edge of the electrolyte membrane are sufficiently bonded, and the remaining of the bubbles is suppressed. Hence, it is possible to provide a membrane electrode assembly where an external leak of a fuel gas and an oxidant gas supplied to a catalyst layer, is suppressed.

The aperture ratios of the through holes may be adjusted, by changing the size of the through holes, or the density of the through holes. For example, by making the size of the through holes of the overlapping portions to be greater than the size of the through holes of the bonding portions, or making the density of the through holes of the overlapping portions to be greater than the density of the through holes of the bonding portions, it is easily achieved that the aperture ratio of the through holes in the overlapping portion is to be greater than the aperture ratio of the through holes in the bonding portion.

When no through hole is disposed in the outer sections of the bonding portions, it can be prevented that the crack is enlarged along the through hole, or the outer section is split off.

The present invention is not limited to the above embodiment, but can be modified in various forms within the range of the claims.

For example, the aperture ratio of the through holes may be adapted so as to be sequentially decreased from the inside of the overlapping portions to the outside of the bonding portions. Moreover, the fuel cell may be composed of a polymer electrolyte fuel cell which uses methanol as a fuel, or may be applied as a stationary power source. The polymer electrolyte fuel cell which uses methanol as a fuel may be a direct methanol fuel cell (DMFC), a micro fuel cell (passive type DMFC), or the like. Ethanol, 1-propanol, 2-propanol, primary butanol, secondary butanol, tertiary butanol, dimethyl ether, diethyl ether, ethylene glycol, diethylene glycol, or the like may be applied as a material other than hydrogen and methanol.

The invention claimed is:

1. A membrane electrode assembly comprising:
   an electrolyte membrane; and
   a frame-shaped first gasket disposed on a first surface of the electrolyte membrane and a second gasket disposed on a second surface of the electrolyte membrane;
   the first and second gaskets have an overlapping portion positioned at a peripheral edge of the electrolyte membrane, a bonding portion which is positioned outside of the peripheral edge and bonded together, and a connection portion between the overlapping portion and the bonding portion which define a void formed between the first and second gaskets in the connection portion between the peripheral portion and the bonding portion;
   the overlapping portion, bonding portion, and connection portion have through holes which extend in a thickness direction perpendicular to the surfaces of the electrolyte membrane whereby the void is in communication with the through holes of the connection portion; and
   an aperture ratio of the through holes of the overlapping portions is greater than an aperture ratio of the through holes of the bonding portions.

2. The membrane electrode assembly according to claim 1, wherein a size of the through holes of the overlapping portions is greater than a size of the through holes of the bonding portions.

3. The membrane electrode assembly according to claim 1, wherein density of the through holes of the overlapping portions is greater than density of the through holes of the bonding portions.

4. The membrane electrode assembly according to claim 1, wherein the bonding portions have inner sections where the through holes are disposed, and outer sections which are positioned outside the inner section and where no through hole is disposed.

* * * * *